April 3, 1956   TERRY TADAO KONO   2,740,221
FISHING LINE GUIDE
Filed July 31, 1952

Terry Tadao Kono
INVENTOR.

United States Patent Office 2,740,221
Patented Apr. 3, 1956

2,740,221
FISHING LINE GUIDE

Terry Tadao Kono, Ewa, Oahu, Territory of Hawaii

Application July 31, 1952, Serial No. 301,831

1 Claim. (Cl. 43—24)

This invention relates in general to improvements in fishing tackle, and more specifically to an improved fishing line guide for fishing rods.

The primary object of this invention is to provide an improved fishing line guide which includes a roller for supporting a fishing line and facilitating the movement thereof through the eye of the guide.

Another object of this invention is to provide an improved fishing line guide which is of a relatively simple construction and which may be formed by conventional metal working tools whereby the same is economically feasible.

A further object of this invention is to provide an improved fishing line guide which includes a generally rectangular eye having a transverse roller rotatably mounted therein, said eye having mounted thereon and associated with the roller guide rods for centering a fishing line with respect to ends of the roller.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Similar characters of reference designate similar or identical elements and portions throughout the specification and throughout the different views of the drawings.

Figure 1:
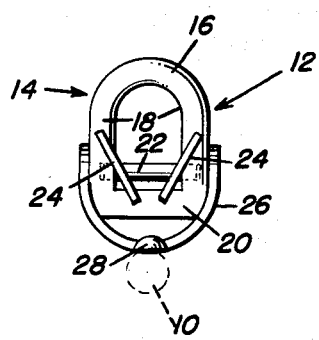
Figure 1 is a rear elevational view of a line guide conforming to the objects of this invention and adapted to be secured to an intermediate portion of a fishing rod, the fishing rod being illustrated by dotted lines.
Figure 2:
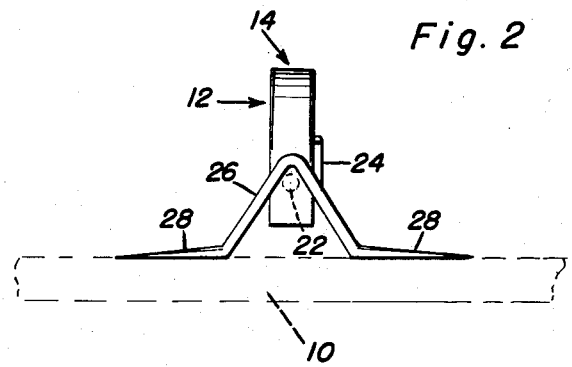
Figure 2 is a side elevational view of the fishing line guide of Figure 1 and shows the specific arrangement of mounting means therefor.

Referring now to the drawings in detail, it will be seen that there is illustrated in Figures 1 and 2 a fishing line guide which is adapted to be secured to an intermediate portion of a fishing rod 10, the fishing line guide being referred to in general by the reference numeral 12. The fishing line guide 12 includes a relatively heavy eye 14 which is generally rectangular in outline and has a curved upper portion 16. The curved upper portion 16 is connected to the upper ends of sides 18, which are in spaced parallel relation and connected together at their lower ends by a base 20.

Extending between the sides 18 and mounted in sockets therein adjacent the lower end thereof is a transversely extending roller 22. It will be understood that the roller 22 is adapted to rotate with respect to the sides 18 and supports a fishing line (not shown) passing through the eye 14. In order that the fishing line may be centered with respect to the roller 22, the rear face of the eye 14 has secured thereto a pair of downwardly converging guide rods 24. It will be noted that the guide rods 24 extend from points intermediate the heights of the sides 18 to points adjacent the center of the base 20.

In order that the eye 14 may be secured to an intermediate portion of the fishing rod 10, the fishing line guide 12 also includes a mount which includes a central portion 26 which is U-shaped as viewed from the rear end of the fishing rod 10. The central portion 26 is of an inverted V-shape as viewed from the sides and has connected to the forward and rear ends thereof extensions 28. The extensions 28 overlie the upper portions of the fishing rod 10 and may be secured thereto in any conventional manner.

Figure 3:
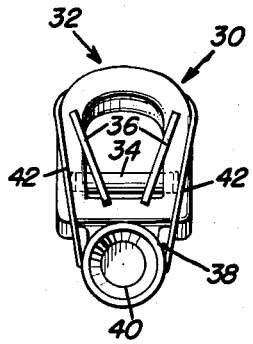
Figure 3 is a rear elevational view of a modified form of fishing line guide which has the same fishing line engaging structure, but is intended for mounting on a tip of a fishing rod.
Figure 4:
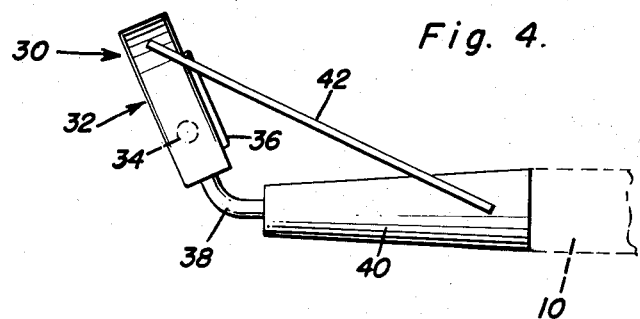
Figure 4 is a side elevational view of the fishing line guide for a tip of a fishing pole and shows the general construction of the mounting means thereof, a fishing rod being illustrated by dotted lines.

Referring now to Figures 3 and 4 in particular, it will be seen that there is illustrated a modified form of fishing line guides which is referred to in general by the reference numeral 30 and is adapted to be mounted on a forward end or tip of the fishing rod 10. The fishing line guide 30 includes an eye 32, which is identical to the eye 14 and includes a roller 34. The eye 32 also has secured to the rear face thereof a pair of downwardly converging guide rods 36.

The eye 32 is provided with mounting means which includes a longitudinally curved U-shaped connecting member 38 which has upper ends thereof attached to the base of the eye 32 in spaced relation. The bottom of the U-shaped connecting member 38 is secured to a forward end of a frusto-conical sleeve 40. The frusto conical sleeve 40 is adapted to receive a tapered end of the fishing rod 10 and be supported thereby. In order that the eye 32 may be braced with respect to the frusto-conical sleeve 40, there is provided a pair of braces 42 which are in spaced relation and are secured to the sides of the eye 32 and the sleeve 40.

It will be seen that as a fishing line (not shown) passes through the eyes 14 and 32 of the guides 12 and 30, respectively, the fishing line will be supported by the rollers associated with the guides and greatly reduce the friction between the fishing line and the eyes. Not only does this reduction in friction enable the fishing line to be reeled in much easier, but it also facilitates the casting of the fishing line inasmuch as the fishing line will have less resistance to its passage through the eyes.

Minor modifications of the device, varying in minor details from the embodiment of the device illustrated and described here, may be resorted to without departure from the spirit and scope of this invention, as defined in the appended claim.

Having described the invention, what is claimed as new is:

A fishing line guide comprising a vertically elongated eye, means secured to said eye for mounting the same, a transverse normally horizontal roller mounted in said eye, said roller being disposed in the lower part of said eye and having ends journaled therein, said eye having a rear face, guide rods secured to said rear face and lying in a common plane, said guide rods being generally vertically disposed and sloping downwardly in converging relation, whereby a fishing line passing through said eye will be urged downwardly into centered engagement with said roller.

References Cited in the file of this patent
UNITED STATES PATENTS

| | | |
|---|---|---|
| D. 143,398 | Cariddi | Jan. 1, 1946 |
| 1,063,402 | Whistler | June 3, 1913 |
| 1,392,687 | Johnston | Oct. 4, 1921 |
| 1,478,643 | Elliott | Dec. 25, 1923 |
| 1,835,310 | Kline et al. | Dec. 8, 1931 |
| 2,385,097 | McLellan | Sept. 18, 1945 |

FOREIGN PATENTS

| | | |
|---|---|---|
| 7,459 | Great Britain | Oct. 4, 1921 |